United States Patent
Walus

[15] 3,676,385
[45] July 11, 1972

[54] COATING COMPOSITIONS OF ACRYLIC-EPOXY ESTER GRAFT COPOLYMERS UTILIZING AZIRIDINYL ALKYL ACRYLATE OR METHACRYLATE IN THE COPOLYMER

[72] Inventor: Aloysius N. Walus, Flint, Mich.
[73] Assignee: E. I. du Pont de Nemours and Company, Wilmington, Del.
[22] Filed: Dec. 22, 1970
[21] Appl. No.: 100,806

[52] U.S. Cl. ....................260/32.8 R, 260/29.1, 260/33.4, 117/75
[51] Int. Cl. ....................C08f 45/34, C08g 51/34
[58] Field of Search ..................260/836, 837, 32.8; 117/75

Primary Examiner—Lewis T. Jacobs
Attorney—Hilmar L. Fricke

[57] ABSTRACT

The novel coating composition consists essentially of a graft copolymer dissolved in an organic solvent wherein the backbone of the graft copolymer is of polymerized constituents of an alkyl acrylate, an alkyl methacrylate in which the alkyl groups have one to three carbon atoms or styrene and also can contain acrylic constituents having adhesion promoting groups; the copolymer has graft into the backbone through a coupling unit of an aziridinyl acrylate or an aziridinyl methacrylate a side chain of an epoxy ester. The composition forms a high quality coating and is useful as a primer or as sealer composition in the manufacture of automobiles and trucks.

14 Claims, No Drawings

COATING COMPOSITIONS OF ACRYLIC-EPOXY ESTER GRAFT COPOLYMERS UTILIZING AZIRIDINYL ALKYL ACRYLATE OR METHACRYLATE IN THE COPOLYMER

BACKGROUND OF THE INVENTION

This invention relates to a coating composition, and in particular, to a high quality coating composition of an acrylic-epoxy ester graft copolymer.

Acrylic coating compositions are well known in the art and have been utilized as exterior coatings for automobiles and trucks. In particular, lacquers of methyl methacrylate as shown in Johnson, U.S. Pat. Nos. 2,782,131 and 2,782,132, both issued Feb. 19, 1957; Crissey U.S. Pat. No. 2,934,509, issued Apr. 26, 1960 and Parker U.S. Pat. No. 3,477,969, issued Nov. 11, 1969, have been utilized for this purpose. Primer compositions and sealer compositions of epoxy copolymers have been used in the automobile and truck manufacturing industry and are shown in Swanson U.S. Pat. No. 3,272,647, issued Sept. 13, 1966 and Rohrbacher U.S. Pat. No. 3,509,086, issued Apr. 28, 1970. Coating compositions have been prepared from copolymers containing aziridinyl acrylates and methacrylates as shown in Ashby U.S. Pat. No. 3,480,601, issued Nov. 25, 1969. While the aforementioned coating compositions, primer compositions and sealer compositions are excellent for many uses in the automobile and truck manufacturing industry, this industry is in need of a primer composition and a sealer composition which has excellent mar, chip and crack resistance and excellent adhesion to the metal substrate and provides a surface to which the exterior acrylic coatings will adhere.

The film-forming polymer utilized in the novel coating composition of this invention has a backbone segment of polymerized acrylic monomers and a side chain segments of an epoxy ester using an aziridinyl acrylate or methacrylate as the coupling unit. The novel composition of this invention has the aforementioned physical properties currently required by industry.

SUMMARY OF THE INVENTION

The coating composition of this invention comprises a solution of 10–50 percent by weight of a film-forming polymer dissolved in an organic solvent, in which the film-forming polymer has a number average molecular weight of about 10,000–150,000 and is a graft copolymer having a polymeric backbone segment and polymeric side chain segments; wherein 1. the polymeric backbone segment comprises 10–90 percent by weight of the copolymer and is of polymerized monomer units which can either be an alkyl acrylate, an alkyl methacrylate, styrene or mixtures thereof, wherein the alkyl groups have one to three carbon atoms and the backbone segment can contain up to 50 percent by weight, based on the weight polymeric backbone segment, of the polymerized acrylic monomers having adhesion promoting groups;

2. the polymeric side chain segments comprise 90–10 percent by weight of the copolymer and are grafted into the backbone segment through a coupling unit that is polymerized into the backbone and has the formula

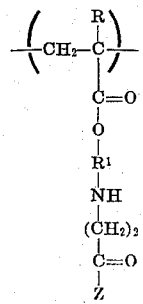

wherein R is either H or —CH$_3$; R$^1$ is an alkylene group of one to eight carbon atoms; and Z is a polymer segment having a molecular weight of about 1,000 – 50,000 and consists essentially of polymerized epoxy ester units.

DESCRIPTION OF THE INVENTION

The novel coating composition of this invention is a solution that contains preferably about 15–30 percent by weight of the film-forming graft copolymer and 0.1–20 percent by weight pigment. This particular composition has excellent physical properties, such as good adhesion to bare metal substrates, chip resistance, crack and mar resistance which makes the coating particularly suitable as a primer composition for bare metals or as a sealer composition. Sealer compositions are applied over a primed surface and provide a finish to which acrylic lacquer or enamel topcoats can be applied. Also, the composition can be used as a primary coating for applicances, such as refrigerators, stoves, washers, dryers and the like.

The graft copolymer utilized in the novel coating composition of this invention is prepared by first forming an epoxy ester prepolymer containing reactive carboxyl groups which is a side chain segment of the graft copolymer by using conventional polymerization techniques for the preparation of epoxy ester polymers. This prepolymer, the backbone monomer units and units of an aziridinyl compound are polymerized to form the graft copolymer. The aziridinyl compound reacts with the carboxyl group of the prepolymers and the resulting product polymerizes with the backbone monomer units to form the graft copolymer. The aziridinyl compound is the coupling unit which couples the prepolymer to the backbone of the polymer. The resulting polymer has a number average molecular weight of about 10,000–150,000 and preferably 15,000–50,000; preferably graft copolymers are utilized that comprise 40–60 percent by weight of backbone segment and 60–40 percent by weight of side chain segments.

The prepolymer is prepared by conventional polymerization techniques in which an epoxy resin, a dicarboxylic acid or a mixture of an anhydride of a carboxylic acid and a dicarboxylic acid, a solvent and a polymerization catalyst are blended together and heated to about 120° to 200° C. for about 1–3 hours to form an epoxy ester prepolymer having a molecular weight of about 1,000–50,000 and preferably 2,000–20,000.

Typical solvents and diluents which are used to prepare the epoxy ester prepolymer are, for example, toluene, xylene, butyl acetate, acetone, methylisobutyl ketone, methylethyl ketone, butyl alcohol, hexane, cellosolve, cellosolve acetate, V M & P naphtha, mineral spirits and other aliphatic cycloaliphatic, aromatic hydrocarbons, esters, ethers, ketones and alcohols.

About 0.1–4 percent by weight, based on the total weight of the monomers used to prepare the prepolymer, of a polymerization catalyst is used, such as sulfonic acid, organo tin compounds such as dibutyl tin dilaurate, dibutyl tin oxide; litharge, titanium complexes, aromatic ammonium hydroxide compounds, for example, benzyltrimethylammonium hydroxide.

The epoxy resins utilized in preparing the epoxy ester prepolymer have the repeating structural formula

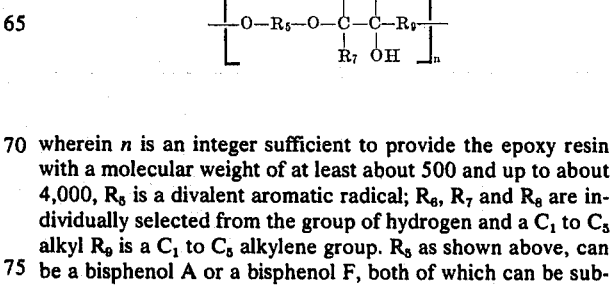

wherein n is an integer sufficient to provide the epoxy resin with a molecular weight of at least about 500 and up to about 4,000, R$_5$ is a divalent aromatic radical; R$_6$, R$_7$ and R$_8$ are individually selected from the group of hydrogen and a C$_1$ to C$_5$ alkyl R$_9$ is a C$_1$ to C$_5$ alkylene group. R$_5$ as shown above, can be a bisphenol A or a bisphenol F, both of which can be substituted. Bisphenol A is para, para-isopropylidene diphenol and bisphenol F is 4,4'-dihydroxydiphenyl methane. Suitable substituents for these compounds include $C_1$ to $C_5$ alkyls, halogens, such as chlorine, bromine and fluorine, and $C_1$ to $C_5$ alkoxy groups.

The preferred epoxy resin is the reaction product of epichlorohydrin and bisphenol A which has the repeating structural formula

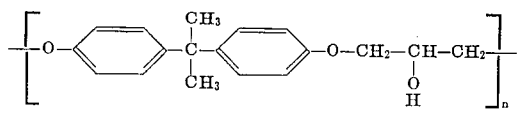

where $n$ is the same as above. Epichlorohydrin and bisphenol A polymer is preferred because it readily forms coatings which have a balance of desired physical properties, such as high tensile strength, excellent solvent resistance and excellent adhesion to substrates and to acrylic lacquers or enamel topcoats.

Another very useful epoxy resin is the reaction product of epichlorohydrin and bisphenol F which has the repeating structural formula

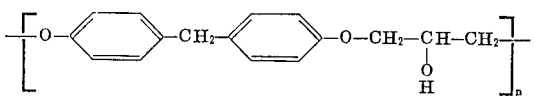

wherein $n$ is as defined above.

The dicarboxylic acid used to prepare the epoxy ester prepolymer is of the general formula

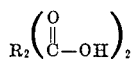

wherein $R_2$ is a divalent organic radical. Also, blends of dicarboxylic acids and anhydrides of dicarboxylic acids can be utilized. Typical dicarboxylic acids can be used to prepare the prepare the polymer are, for example, aromatic dicarboxylic acids, aliphatic dicarboxylic acids, alicyclic dicarboxylic acids, or a mixture of any of these acids and anhydrides of these acids. Typical saturated aliphatic dicarboxylic acids are succinic, glutaric, adipic, pimelic, suberic, azelaic, brassic, dodecanedoic and the like; alicyclic dicarboxylic acids are, for example, hexahydroterephthalic acid, tetrahydroisophthalic acid, tetrahydroterephthalic acid, hexahydrophthalic acid, tetrahydrophthalic acid; typical aromatic dicarboxylic acids are isophthalic acid, terephthalic acid, 1,5-naphthalene dicarboxylic acid, 2,2'-dibenzoic dicarboxylic acid, 2,2'-isopropylidenedibenzoic acid, 2,2'-ketodibenzoic acid, oxydibenzoic acid, 2,2'-sulfondibenzoic acid, and the like.

Up to 15 percent by weight monobasic acids can be utilized in preparing the epoxy ester, such as benzoic acid, acetic acid, propionic acid, caproic acid, pelargonic acid, lauric acid, palmetic acid, stearic acid and the like. Also, drying oil fatty acids, such as tung oil, can also be utilized in preparing the epoxy ester prepolymer.

One method for preparing the graft copolymer is to form an epoxy ester prepolymer that contains about 0.1-20 percent by weight of a carboxylic acid. The free carboxyl reacts with the aziridinyl group of the aziridinyl compound. The ethylenically unsaturated portion of the aziridinyl compound reacts with the backbone monomer units to form the graft copolymer. Preferably, one mole of the aziridinyl compound is used per mole of prepolymer to form a high quality graft copolymer. Generally, the graft copolymer contains residual unreacted carboxylic acids. The amount of residual acid may be about 0.1-5 percent by weight of the resulting graft copolymer polymer.

The technique that provides a high quality graft copolymer is to neutralize one of the carboxyl groups of the prepolymer with a basic compound and then react this prepolymer with the aziridinyl compound. The molar ratio of basic compound to carboxyl equivalent of prepolymer to aziridinyl compound is maintained at 1:1:1. The resulting product is then polymerized with the backbone monomers to form the graft copolymer. Typical basic compounds that can be used volatilize below 100° C. and are, for example, ammonia, ammonium hydroxide, primary amines, secondary amines, tertiary amines and polyamines, such as monoethanolamine, diethanolamine, diethylamine, triethylamine, methyldiethanolamine and the like.

The graft copolymer is prepared by conventional polymerization techniques in which the constituents can be diluted with additional solvents and a polymerization catalyst is added and the constituents are heated to about 75°-150° C. for about 2–6 hours to form the graft copolymer. Any of the aforementioned solvents can be added.

About 0.1-4 percent by weight, based on the weight of the constituents used to prepare the graft copolymer, of a polymerization catalyst is used, such as ditertiary butyl peroxide, cumene hydroperoxide, azo-bis-isobutyronitrile.

Typical monomer units which are used to form the backbone of the graft copolymer are styrene, alkyl acrylates or alkyl methacrylates having one to three carbon atoms in the alkyl group, such as methyl methacrylate, propyl methacrylate, ethyl acrylate, propyl acrylate and the like. Optionally, up to 10 percent by weight of the backbone segment of units of $\alpha,\beta$-unsaturated carboxylic acid can be used such as, acrylic acid, methacrylic acid, crotonic acid, ethacrylic acid, itaconic acid and the like. Acrylic acid and methacrylic acid are preferred in amounts of 0.1-5 percent by weight of the backbone segment.

Up to 50 percent by weight, based on the weight of the backbone segment of the polymer, of acrylic monomers which have adhesion promoting groups, can be utilized. Typical monomers which provide adhesion promoting groups are hydroxyaminopropyl methacrylate, 3-amino methacrylate, diethylaminoethyl methacrylate, dimethylaminoethyl methacrylate, 2-aminopropyl methacrylate, 2-aminoethyl methacrylate, t-butylaminoethyl methacrylate, 2-(1-aziridinyl)-ethyl methacrylate, n-2-hydroxypropylmethacrylamide and n-2-hydroxyethylmethacrylamide.

The following are examples of typical acrylic backbone monomers having adhesion promoting groups suitable for use in preparing graft copolymers used in this invention: 97/3-99/1 methyl methacrylate/hydroxyaminopropyl methacrylate; 95/3/2 methyl methacrylate/methacrylic acid/3-amino-3-hydroxpropyl methacrylate; 50/50-99/1 methyl methacrylate/diethylaminoethyl methacrylate; 75/25-99/1 methyl methacrylate/2-aminopropyl methacrylate; 75/25-99/1 methyl methacrylate/2-aminoethyl methacrylate; 50/50-99/1 methyl methacrylate/2-(1-aziridinyl)-ethyl methacrylate; 50/50-99/1 methyl methacrylate/t-butyl-aminoethyl methacrylate; 50/50-99/1 methyl methacrylate/dimethylaminoethyl methacrylate; 90/10-99/1 methyl methacrylate/N-2-hydroxypropyl methacrylamide; 90/10-99/1 methyl methacrylate/N-2-hydroxyethyl methacrylamide.

One particularly preferred adhesion promoting group is provided by a monomer having the formula

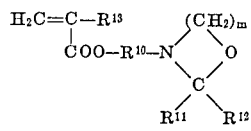

wherein $m$ is an integer having a value of 2 to 3, $R^{13}$ is selected from hydrogen, methyl, ethyl. $R^{10}$ is selected from $C_1$ to $C_5$ alkylene groups, and $R^{11}$ and $R^{12}$ are selected from (1) separate groups selected individually from (a) hydrogen, phenyl, benzyl and $C_1$ to $C_{12}$ alkyl groups in the case of $R^{11}$ and (b) hydrogen and $C_1$ to $C_4$ alkyl groups in the case of $R^{12}$, and (2)

a single group selected from pentamethylene and tetramethylene which, together with the carbon atom to which the single group is attached, forms a carbocyclic group.

The aforementioned adhesion promoting monomer used in the acylic polymer of this invention is prepared according to the procedure described in the aforementioned U.S. Pat. No. 3,037,006, the disclosure of which is incorporated by reference. An especially preferred embodiment of this adhesion promoting monomer used in the backbone of the polymer of this invention is of the formula

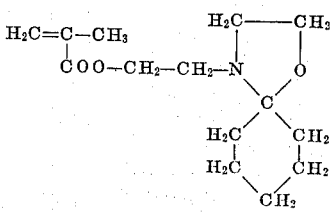

It will be apparent to those skilled in the art that this monomer can be referred to as (1) 3-(β-methacryloxyethyl)-2,2-pentamethylene-oxazolidine; (2) 3-(2-methacryloxyethyl)-2,2-spirocyclohexyl-oxazolidine; (3) MESO or (4) 1-oxa-4-(2'-methacryloxyethyl)-4-azaspiro [4.5] decane.

One particularly preferred backbone used in this invention contains about 80–99 percent by weight methyl methacrylate and about 1–20 percent by weight of 3-(2-methacryloxyethyl)-2,2-spirocyclohexyl oxazolidine.

The aziridinyl compound utilized in this invention to form the graft copolymer has the formula

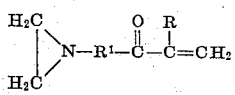

where R is H or —CH$_3$ and R$^1$ is an alkylene group having one to eight carbon atoms. Typical aziridinyl compounds of this type are aziridinyl acrylates or methacrylates, such as 2-(1-aziridinyl) alkyl acrylate, such as 2-(1-aziridinyl) ethyl acrylate, 2-(1-aziridinyl) propyl acrylate, 2-(1-aziridinyl) butyl acrylate, 2-(1-aziridinyl) hexyl acrylate, 2-(1-aziridinyl) octyl acrylate, 2-(1-aziridinyl) ethyl methacrylate, 2-(1-aziridinyl) propyl methacrylate, 2-(1-aziridinyl) butyl methacrylate, 2-(1-aziridinyl) hexyl methacrylate, 2-(1-aziridinyl) octyl methacrylate. One particularly preferred compound is 2-(1-aziridinyl) ethyl methacrylate since it forms graft copolymers of high quality. Preferably, only 1 mole of the aziridinyl compound is utilized for 1 mole of the prepolymer in the process for forming the graft copolymer.

Small amounts of a plasticizer can also be used in the composition, such as butyl benzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol, poly(propylene adipate) dibenzoate diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexylester of hexamethylene diphthalate, di(methylcyclohexyl) phthalate.

Other plasticizers that can be used are epoxidized soya bean oil, oil-free and oil-modified alkyd resins and polyesters, such as polyethylene terephthalate esters, polyalkylene adipate esters, polyarylene adipate esters, polyesters of adipic acid/neopentyl glycol/benzoic acid, coconut oil/phthalic anhydride/ethylene glycol and the like.

Pigments are used in the novel coating composition of this invention in the amounts of 0.1–20.0 percent by weight, and preferably, about 0.3–6.0 percent by weight of pigment, is used. Preferably, the pigment is formed into a mill base using conventional techniques and then blended with the composition. Examples of the great variety of pigments which are used in the novel coating composition of this invention are metallic oxides, preferably titanium dioxide, zinc oxide, and the like, metal hydroxides, metal flakes, metal powders, chromates, such as lead chromate, sulfides, sulfates, carbonates, carbon black, silica, talc, china clay, lead and iron blues, organic reds, maroons, organic dyes, lakes, etc.

The novel coating compositions of this invention can be applied to a variety of substrates, for example, unprimed or primed metal substrates, wood, glass, plastics, such as polypropylene, styrene, copolymers of styrene and the like, by any of the usual application methods, such as spraying, electrostatic spraying, dipping, brushing, flow coating and the like. These coatings are baked at about 110°–200° C. for about 10–60 minutes. The resulting coating is about 0.5–5 mils thick, preferably 1–2 mils thick and can be rubbed or polished in accordance with conventional techniques, if desired, to improve smoothness or apparent gloss or both.

One sealer composition that can be prepared from the novel coating composition of this invention contains 30–70 percent by weight of the graft copolymer, and correspondingly, 70–30 percent by weight of a high molecular weight epoxy resin that has a molecular weight of about 20,000 up to 200,000 and above. The epoxy resin is of the type described herein and the preferred type is the reaction product of epichlorohydrin and bisphenol A since it forms the high quality sealer composition.

The novel coating composition of this invention has excellent adhesion to bare or treated metals or to metals which have been previously painted with alkyd or acrylic enamels. Also, the novel composition can be a highly pigmented coating or can be used as a clear sealer coating. The novel composition can be used as a topcoating, for example, on appliances, such as refrigerators, stoves, or as a coating for industrial machinery and the like. When used as a primer or a sealer composition, topcoats of lacquers and enamels have excellent adherence to the novel coating composition of this invention which also has excellent mar and chip and scratch resistance.

The following examples illustrate this invention. The parts and percentages are by weight unless otherwise specified.

EXAMPLE 1

The following ingredients are charged into a reaction vessel equipped with a stirrer and a reflux condenser to form an epoxy ester prepolymer:

| | Parts by weight |
|---|---|
| Portion 1: | |
| Epoxy resin ("Epon" 1004)* | 1,375.50 |
| Benzoic acid | 21.50 |
| Adipic acid | 103.00 |
| Lithium ricinoleate | 0.75 |
| Benzyltrimethyl ammonium hydroxide | 2.00 |
| Ethylene glycol mono ethyl ether | 265.00 |
| Portion 2: | |
| Ethylene glycol mono-ethyl ether | 735.00 |
| Portion 3: | |
| Ethylene glycol mono-ethyl ether | 500.00 |
| Portion 4: | |
| Ethylene glycol mono-ethyl ether | 333.00 |
| Total | 3,335.75 |

*"Epon" 1004 has the following structural formula:

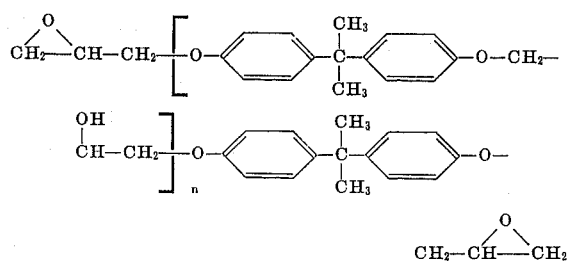

and has a Gardner Holdt viscosity measured at 40% by weight solution in butyl carbitol at 25° C. of Q–U, and has an epoxy equivalent of 875–1025. The epoxy equivalent is the grams of resin containing 1-gram equivalent of epoxide.

Portion 1 is charged into a reaction vessel equipped with a stirrer and a reflux condenser and the ingredients are heated to the reflux temperature and are held at this temperature for about 2 hours. Portion 2 is then slowly added over a 10-minute period and the temperature of the reaction mixture is slowly reduced to room temperature. Portion 3 is then added and thoroughly blended and then Portion 4 is added. The resulting prepolymer solution has a polymer solids content of 45.4 percent and the solution has a Gardner Holdt viscosity measured at 25° C. of $Z_2$. The polymer has an acid number of 7.67.

A graft copolymer is prepared by reacting the following ingredients:

|  | Parts By Weight |
|---|---|
| Portion 1 | |
| Prepolymer polymer solution prepared above (45.4% solids) | 500.0 |
| Triethylamine | 5.0 |
| Portion 2 | |
| Butyl alcohol | 180.0 |
| Portion 3 | |
| 2-(1-Aziridinyl) methyl methacrylate | 7.7 |
| Portion 4 | |
| Pelargonic acid | 2.7 |
| Portion 5 | |
| Acetone | 215.0 |
| Portion 6 | |
| MMA/MESO copolymer [methyl methacrylate/3-(2-methacryloxyethyl)-2,2-spirocyclohexyl oxazolidine, weight ratio 85/15] | 210.1 |
| Tertiary butyl amino ethyl methacrylate | 4.5 |
| Azo-bis-isobutyronitrile | 2.0 |
| Portion 7 | |
| Azo-bis-isobutyronitrile | 0.8 |
| Portion 8 | |
| Azo-bis-isobutyronitrile | 0.3 |
| Total | 1128.1 |

Portion 1 is charged into a reaction vessel equipped with a stirrer and a reflux condenser and blended together. Portion 2 is then charged into the reaction vessel and blended with Portion 1. Portion 3 is then charged into the reaction vessel and the ingredients are heated to the reflux temperature which is about 120° C. and held at the reflux temperature for about 1 hour. Portion 4 is then added and the reaction mixture is refluxed for an additional hour. Portion 5 is then slowly added over a 10-minute period while maintaining the reaction mixture at its reflux temperature. Portion 6 is then added and the reaction mixture is maintained at its reflux temperature for about 1 ½ hours. Portion 7 is then added and the reaction mixture is maintained at its reflux temperature for an additional 45 minutes. Portion 8 is then added and the reaction mixture is refluxed for about 1 hour and 10 minutes.

The resulting polymer has an acid number of 2.1 and a relative viscosity of 1.133 measured at 0.5 percent polymer solids in ethylene dichloride at 25° C. and the polymer solution has a total polymer solids content of 39.1 percent and a Gardner Holdt viscosity of about Y measured at 25° C.

A mill base is prepared as follows:

|  | Parts By Weight |
|---|---|
| Carbon Black pigment | 0.70 |
| Titanium dioxide pigment | 20.13 |
| Aluminum silicate pigment | 19.91 |
| Polymer solution prepared above (39.1% polymer solids) | 21.05 |
| Solvent blend | 38.21 |
| Total | 100.00 |

The above ingredients are premixed and then charged into a conventional sand mill and ground in one pass to a 0.2 mill fineness.

The solvent blend utilized in the above mill base consists of 31 percent by weight methylethyl ketone, 24.1 percent by weight cellusolve, 23.2 percent by weight isopropanol and 21.7 percent by weight toluene.

A sealer composition suitable for use in bonding an automotive acrylic lacquer to a pigmented alkyd primer composition is prepared as follows:

|  | Parts by Weight |
|---|---|
| High molecular weight epoxy resin (200,000 molecular weight of a polymer of epichlorohydrin and bisphenol A) | 22.33 |
| Acrylic-graft copolymer epoxy resin solution (prepared above) | 23.78 |
| Diethylamine | 0.08 |
| Mill base (prepared above) | 14.44 |
| Solvent blend (described above) | 39.37 |
| TOTAL | 100.00 |

These ingredients are charged into a mixer and agitated for 1 hour. The resulting composition has a total solids content of 27.2 percent by weight and a No. 2 Zahn cup viscosity of 24 seconds.

The composition is then reduced to a spray viscosity using the aforementioned solvent blend and a steel substrate coated with an alkyd primer composition pigmented with iron oxide is sprayed with the composition and air dried for 5 minutes, giving a sealer film of 0.25 mil in thickness. A coating of a standard automotive acrylic lacquer is then applied over the substrate using conventional spraying and baking procedures. The acylic topcoat has excellent adhesion to the substrate and the composite has excellent chip resistance as measured by a gravelometer tester, excellent crack resistance and excellent adhesion to the substrate.

EXAMPLE 2

The following ingredients are charged into a reaction vessel equipped with a stir and a reflux condenser to form an epoxy ester prepolymer:

Portion 1

|  | Parts by Weight |
|---|---|
| "Empol" 1014 (dimer fatty acids) | 229.50 |
| Benzoic acid | 12.00 |
| "Epon" 1004 (Described in Example 1) | 785.50 |
| Benzyl trimethyl ammonium hydroxide | 1.25 |
| Lithium ricinoleate | 0.50 |
| Dibutyl carbitol | 177.00 |
| Methyl isoamyl ketone | 48.00 |
| Portion 2 | |
| Ethylene glycol monoethyl ether | 500.00 |
| Xylene | 275.00 |
| Total | 2028.75 |

Portion 1 is charged into a reaction vessel and the ingredients are heated to the reflux temperature and held at this temperature for about 3 hours. Portion 2 is then slowly added over a 5 minute period and the temperature of the reaction mixture is slowly reduced to room temperature. The resulting prepolymer solution has a polymer solids content of about 50 percent and has a Gardner Holdt viscosity measured at 25° C. of $Z_3$. The polymer has an acid number of about 7.0.

A graft copolymer is prepared by reacting the following ingredients:

|  | Parts by Weight |
|---|---|
| Portion 1 | |
| Prepolymer solution prepared above (50% solids) | 540.0 |
| Triethylamine | 6.0 |
| Butyl alcohol | 180.0 |
| Portion 2 | |
| 2-(1-Aziridinyl) methyl methacrylate | 9.0 |
| Portion 3 | |
| Pelargonic acid | 3.6 |
| Portion 4 | |
| Acetone | 220.0 |
| Portion 5 | |
| Toluene | 224.0 |
| MESO/MMA Copolymer [3-(2-methacryloxyethyl)2,2- spirocyclohexyl oxazolidine/methyl methacrylate copolymer, weight ratio 15/85) ] | 311.4 |
| T-butyl-amino ethyl methacrylate | 6.0 |
| Azo-bis-isobutyronitrile | 3.0 |
| Portion 7 | |
| Azo-bis-isobutyronitrile | 1.2 |
| Portion 8 | |

| | |
|---|---|
| Azo-bis-isobutyronitrile | 0.6 |
| Portion 9 | |
| Azo-bis-isobutyronitrile | 0.6 |
| Total | 1505.4 |

Portion 1 is charged into a reaction vessel equipped with a stirrer and reflux condenser and the ingredients are blended together. The reaction vessel is then heated, then Portion 2 is charged into the reaction vessel and blended with Portion 1. Then the ingredients are heated to the reflux temperature, which is about 120° C. and held at this reflux temperature for about 1 hour. Portion 3 is added and the reaction mixture is refluxed for an additional hour. Portion 4 is then slowly added over a 5-minute period and thoroughly blended with the reaction mixture. Portion 5 is added and Portion 6 is added and the reaction mixture is heated to its reflux temperature and held at this temperature for an additional hour. Portion 7 is added and the reaction mixture is held at its reflux temperature for an additional 45 minutes. Portion 8 is added and the reaction mixture is refluxed for an additional 45 minutes. Portion 9 is then added and the reaction mixture is refluxed for an additional hour.

The resulting polymer has an acid number of 1.6 and a relative viscosity of 1.157 measured at 0.5 percent polymer solids in ethylene dichloride at 25° C. The polymer solution has a total polymer solids content of 39.2 percent and the Gardner Holdt viscosity measured at 25° C. of about $z_2$.

The above prepared polymer solution is reduced to a spray viscosity utilizing the solvent blend described in Example 1 and applied to a steel substrate primed with an alkyd resin pigmented with iron oxide and baked at 200° C. for 30 minutes. The resulting film is clear and has excellent adhesion to the substrate and forms an excellent finish.

A sealer composition suitable for use in bonding an automotive acrylic lacquer to a pigmented alkyd primer composition is prepared as follows:

| | Parts By Weight |
|---|---|
| High molecular weight epoxy resin (200,000 molecular weight resin of a polymer of epichlorohydrin and bisphenol A) | 22.33 |
| Graft copolymer solution (39.2% solids prepared above) | 23.78 |
| Diethylamine | 0.80 |
| Mill base composition (prepared in Example 1) | 14.44 |
| Solvent blend (described in Example 1) | 39.37 |
| Total | 100.72 |

These ingredients are charged into a mixer and agitated for 1 hour. The resulting composition has a total solids content of 27.2 percent, and a No. 2 Zahn cup viscosity of 24 seconds).

The composition is then reduced to a spray viscosity using the solvent blend (described in Example 1) and a steel substrate coated with an alkyd primer composition pigmented with iron oxide is sprayed with the composition and air dried for about 5 minutes, giving a film of about 0.25 mils in thickness. A coating of a standard automotive acrylic lacquer is then applied over the above coating using conventional procedures. The acrylic lacquer topcoat has excellent adhesion to the substrate. The composite of the primer, sealer coat and the acrylic topcoat has excellent chip resistance, as measured by a gravelometer test, excellent crack resistance and excellent adhesion to the substrate.

What is claimed is:

1. A coating composition comprising a solution of 10–50 percent by weight of a film-forming polymer in an organic solvent wherein the film-forming polymer has a number average molecular weight of 10,000–150,000 and consists essentially of a graft copolymer having a polymeric backbone segment and polymeric side chain segments; wherein 1. the polymeric backbone segment comprises 10–90 percent by weight of the copolymer and consists essentially of polymerized monomer units selected from the group consisting of an alkyl acrylate, alkyl methacrylate, styrene and mixtures thereof in which the alkyl groups have one to three carbon atoms and up to 50 percent by weight, based on the weight of the backbone segment, of polymerized acrylic monomers having adhesion promoting groups;

2. the polymeric side chain segments comprise 90–10 percent by weight of the copolymer and are grafted into the backbone segment through a coupling unit that is polymerized into the backbone that has the formula

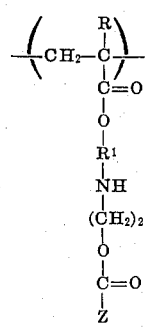

where R is selected from the group consisting of H and —CH$_3$; R$^1$ is an alkylene group of one to eight carbon atoms; Z is a polymer segment having a molecular weight of 1,000–50,000 and consists essentially of polymerized epoxy ester units.

2. The coating composition of claim 1 containing 15–30 percent by weight of the film-forming polymer, and 0.1–20 percent by weight pigment.

3. The coating composition of claim 1 in which the graft copolymer has a number average molecular weight of about 15,000 to 50,000 and the backbone segment comprises 40–60 percent by weight of the copolymer and the side chain segment having a molecular weight of 2,000–20,000 correspondingly comprises 60–40 percent by weight of the copolymer.

4. The coating composition of claim 3 in which R is —CH$_3$ and R$^1$ is an alkylene group having two carbon atoms.

5. The coating composition of claim 4 in which the epoxy ester is the esterification product of a dicarboxylic acid of the formula

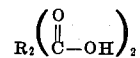

and a epoxy hydroxy polyether resin where R$^2$ is a divalent organic radical.

6. The coating composition of claim 5 in which the epoxy hydroxy polyether resin has the following recurring structural unit

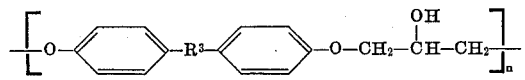

where $n$ is a positive integer sufficiently large to provide a molecular weight of 500–4,000 and R$^3$ is alkylene group.

7. The coating composition of claim 6 in which R$^3$ is selected from the group consisting of —CH$_2$— and

and R$^2$ is selected from the group consisting of a divalent aromatic radical, a divalent alkylene radical having two to 15 carbon atoms and a mixture thereof.

8. The coating composition of claim 1 containing 10–30 percent by weight, based on the weight of the backbone segment, of acrylic adhesion promoting monomers selected from the group consisting of hydroxy amino alkyl methacrylate, hydroxy amino alkyl acrylate wherein the alkyl groups have two to four carbon atoms; 3-(2-methacryloxyethyl)-2,2-spirocyclohexyl oxazolidine, dialkyl amino alkyl methacrylate, dialkyl amino alkyl acrylate, wherein the alkyl groups have one to four carbon atoms.

9. The coating composition of claim 7 containing 40–60 percent by weight, based on the weight of graft copolymer, of backbone segment in which the backbone segment consists essentially of 70–94 percent by weight methyl methacrylate and 25–5 percent by weight of 3-(2-methacryloxyethyl)-2,2-spirocyclohexyl oxazolidine and about 1–5 percent by weight of t-butylamino ethyl methacrylate and correspondingly of 60–40 percent by weight of side chain segment of epoxy ester.

10. The coating composition of claim 9 in which the $R^3$ of the epoxy ester is

and the dicarboxylic acid used to prepare the epoxy ester is a blend of benzoic acid and adipic acid.

11. The coating composition of claim 9 in which $R^3$ of the epoxy ester is

and the dicarboxylic acid used to prepare the epoxy ester is a blend of dimer fatty acids and benzoic acid.

12. A sealer composition comprising a solution of 10–50 percent by weight of film-forming constituents in an organic solvent wherein the film forming constituents comprise
  I. 30–70 percent by weight, based on the weight of the film-forming constituents of the composition, of an epoxy resin having a molecular weight of about 20,000–200,000 of the formula

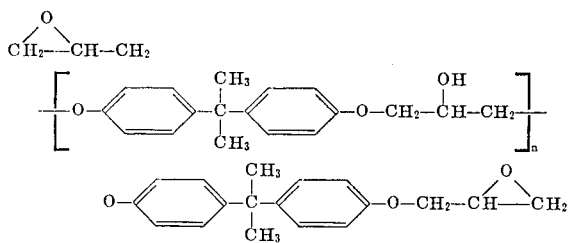

where $n$ is a positive integer sufficiently large to provide the above molecular weight, and
  II. 70–30 percent by weight of the graft copolymer of claim 1 in which the backbone segment comprises 40–60 percent by weight of the copolymer and consists essentially of about 70–94 percent by weight of methyl methacrylate and about 25–5 percent by weight of 3-(2-methacryloxyethyl)-2,2-spirocyclohexyl oxazolidine and about 1-5 by weight of t-butylaminoethyl methacrylate and the side chain segment comprises 60–40 percent by weight of the graft copolymer and consists essentially of an epoxy hydroxy polyether resin having the following recurring structural unit

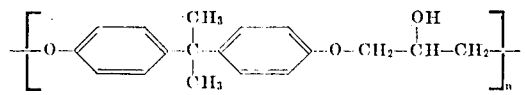

where $n$ is a positive integer sufficiently large to provide a molecular weight of 500–4,000 and is esterified with a blend of adipic acid and benzoic acid.

13. A sealer composition comprising a solution of 10–50 percent by weight of film based on the weight of the film-forming constituents of the composition, of an epoxy resin having a molecular weight of about 20,000–200,000 of the formula

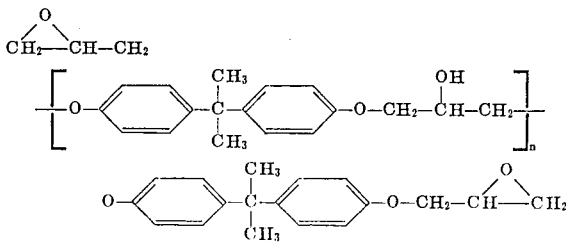

where $n$ is a positive integer sufficiently large to provide the above molecular weight; and
  II. 70–30 percent by weight of the graft copolymer of claim 1 in which the backbone segment comprises 40–60 percent by weight of the copolymer and consists essentially of about 70–94 percent by weight of methyl methacrylate, about 25–5 percent by weight of 3-(2-methacryloxyethyl)-2, 2-spirocyclohexyl ocazolidine and about 1–5 percent by weight of t-butylaminoethyl methacrylate and the side chain segment comprises 60–40 percent by weight of the graft copolymer and consists essentially of an epoxy hydroxy polyether resin having the following recurring structural unit

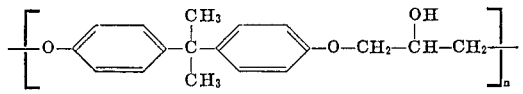

where $n$ is a positive integer sufficiently large to provide a molecular weight of about 500–4,000 and is esterified with a blend of benzoic acid and dimer fatty acids.

14. A ferrous metal substrate coated with a pigmented primer composition and the primer composition is coated with a dried coalesced layer of the sealer composition of claim 12.

* * * * *

PO-1050
(5/69)

UNITED STATES PATENT OFFICE
CERTIFICATE OF CORRECTION

Patent No. 3,676,385      Dated July 11, 1972

Inventor(s) Aloysius N. Walus

It is certified that error appears in the above-identified patent and that said Letters Patent are hereby corrected as shown below:

Column 1, line 65, delete the formula and insert the following:

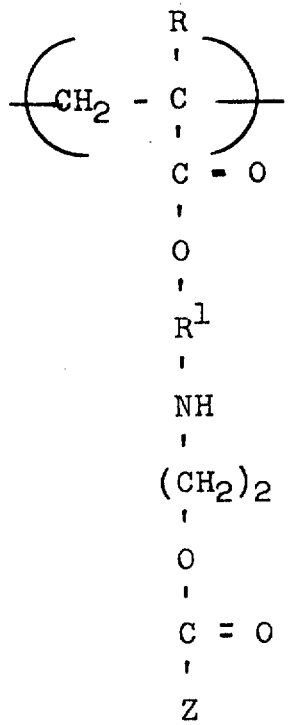

Column 5, line 33, delete the formula and insert the following:

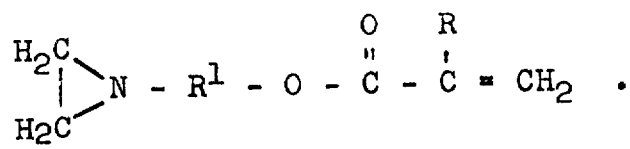

Signed and sealed this 23rd day of January 1973.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. __U.S. 3,676,385__   Dated __July 11, 1972__

Inventor(s)_____

It is certified that error appears in the above-identified patent and that said Letters Patent are hereby corrected as shown below:

Column 7, line 27 and Column 8, lines 69 and 71, delete "copolymer".

Signed and sealed this 26th day of June 1973.

(SEAL)
Attest:

EDWARD M. FLETCHER, JR.
Attesting Officer

ROBERT GOTTSCHALK
Commissioner of Patents